Jan. 24, 1939.　　　　　W. B. PAYNE　　　　　2,144,930
PAPER FEEDING MECHANISM
Filed Jan. 30, 1937　　　　7 Sheets-Sheet 1

INVENTOR
Walter B. Payne
BY Raymond E. Bohrer
his ATTORNEY

Jan. 24, 1939.　　　　　W. B. PAYNE　　　　　2,144,930
PAPER FEEDING MECHANISM
Filed Jan. 30, 1937　　　7 Sheets-Sheet 4
Fig. 5
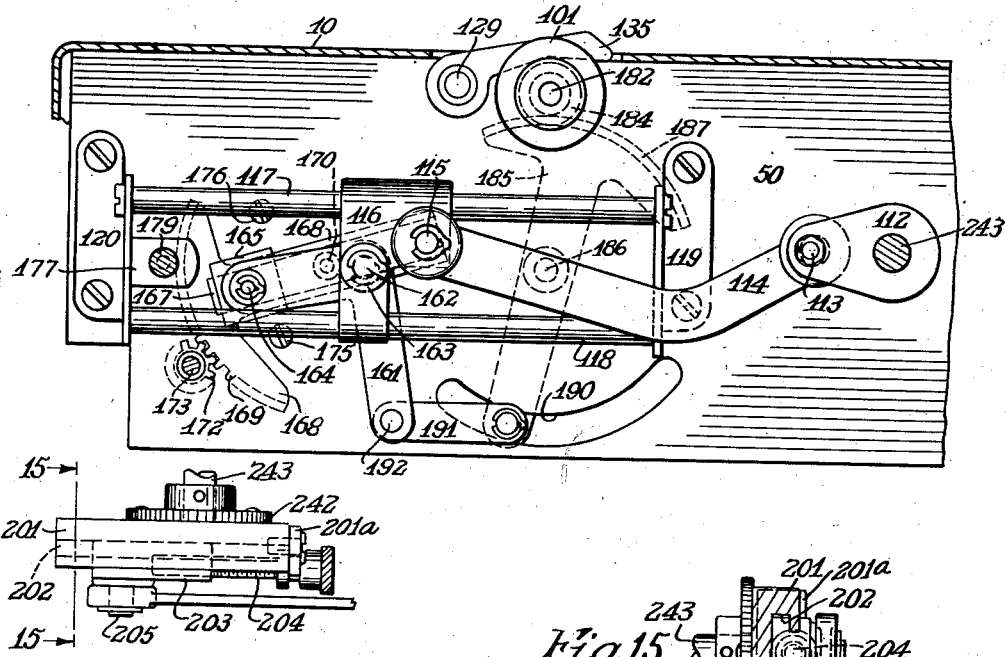
Fig. 14　　　Fig. 15
Fig. 6
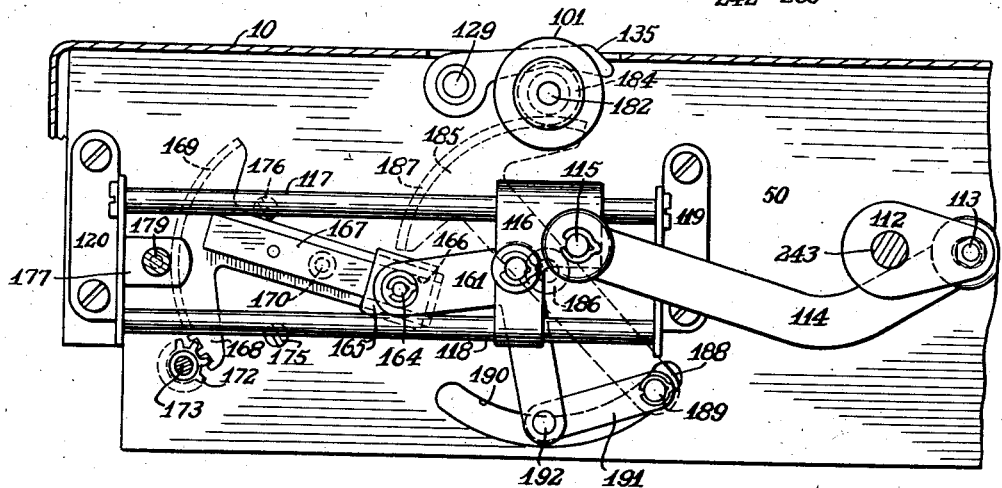
INVENTOR
Walter B. Payne
BY
his ATTORNEY

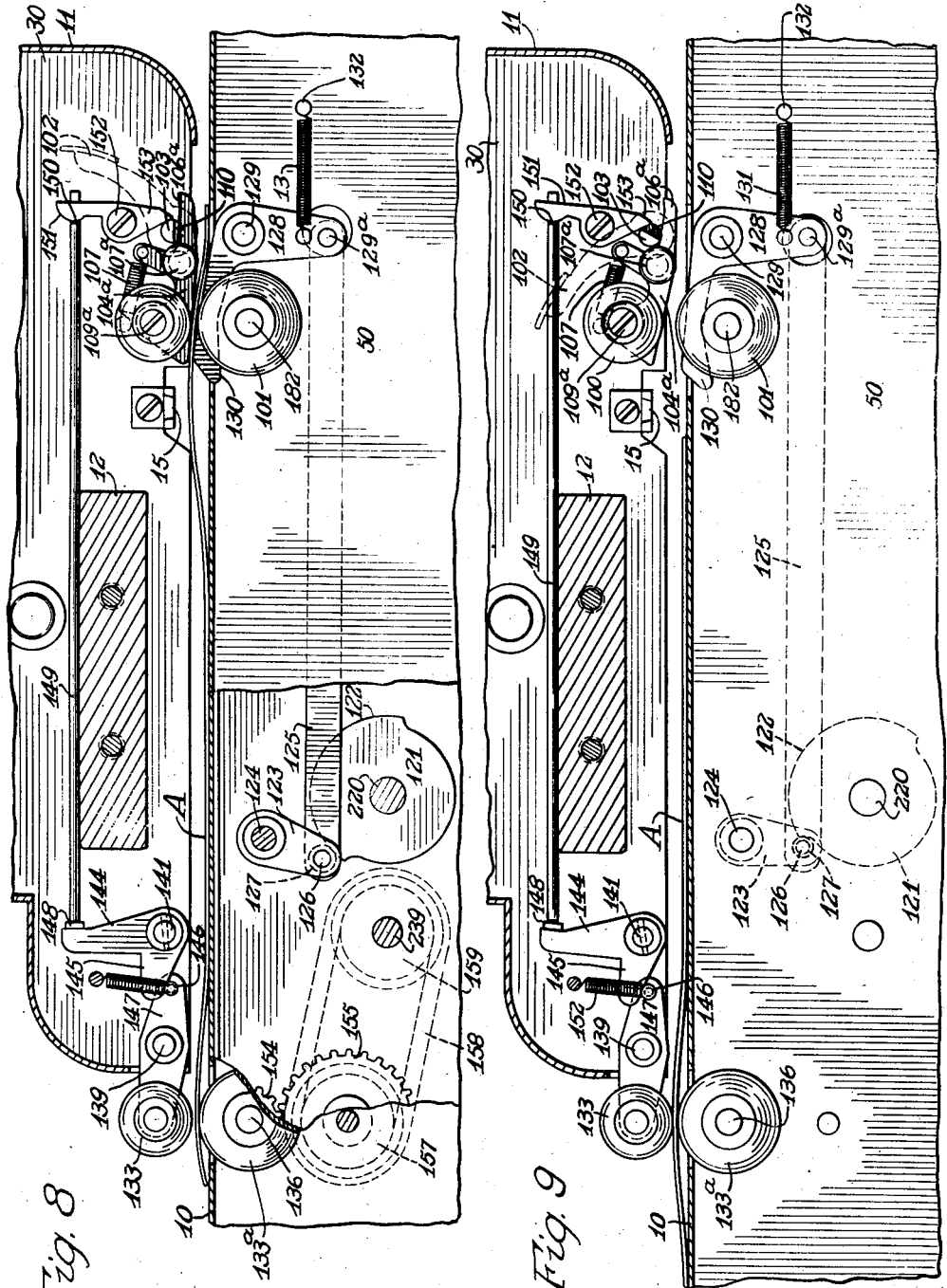

Jan. 24, 1939.  W. B. PAYNE  2,144,930
PAPER FEEDING MECHANISM
Filed Jan. 30, 1937   7 Sheets-Sheet 6

INVENTOR
Walter B. Payne
BY Raymond F. Bohrer
his ATTORNEY

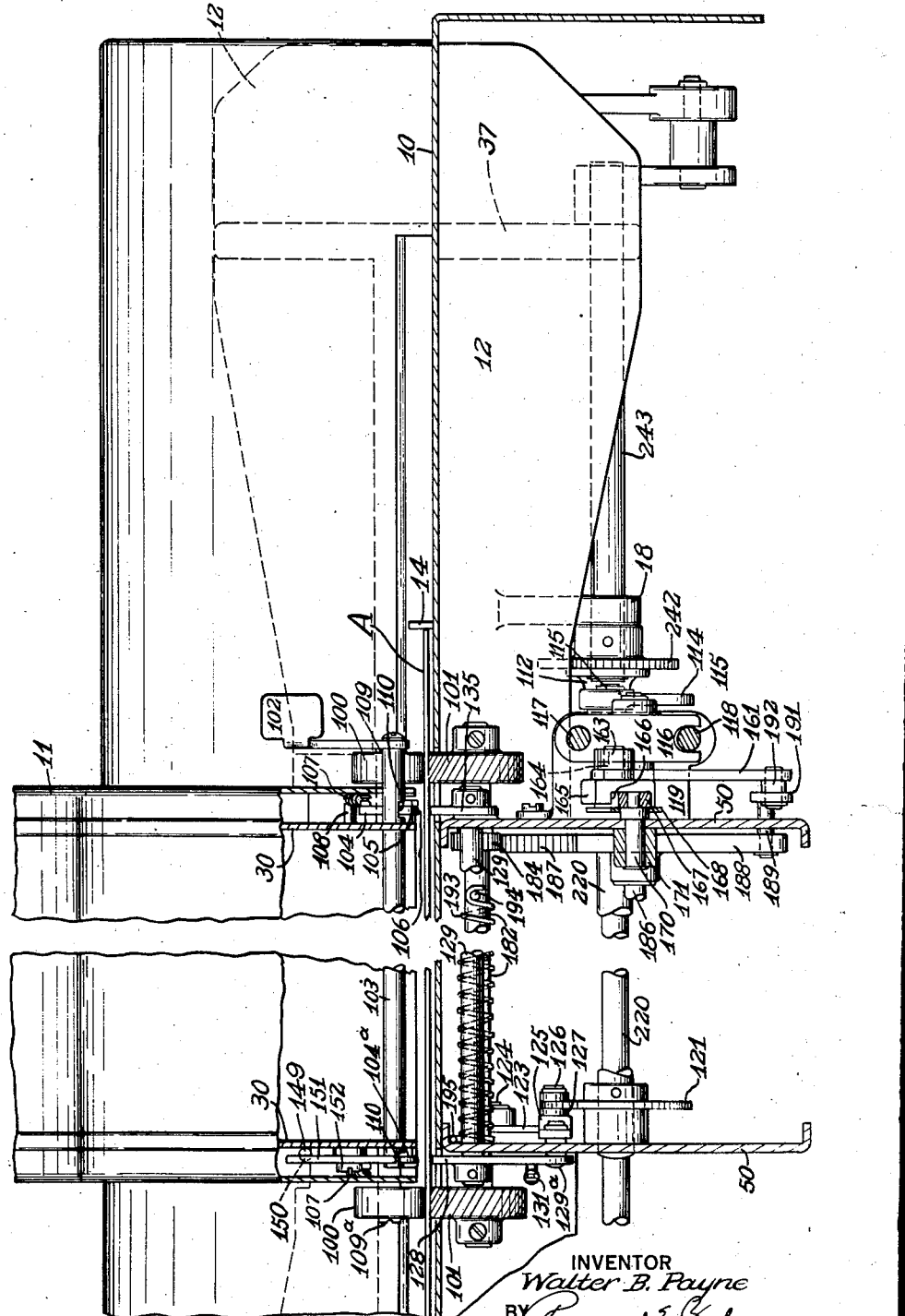

Patented Jan. 24, 1939

2,144,930

UNITED STATES PATENT OFFICE

2,144,930

PAPER FEEDING MECHANISM

Walter B. Payne, Rochester, N. Y., assignor to
The Todd Company, Inc., Rochester, N. Y., a
corporation of New York Application January 30, 1937, Serial No. 123,161

19 Claims. (Cl. 271—2.4)

This invention relates to a sheet feeding device adapted for use with various machines, such as printing machines and the like. Some of the features of the invention are applicable to such machines generally, but certain features of it are especially applicable to machines for printing indicia on sheets or continuous webs of checks, drafts or other business forms.

Generally stated, the invention has for its principal object to provide certain improvements in the means for handling sheets made up of a series of connected forms or long webs of paper, and especially where the sheets or webs are pre-printed to constitute a succession of separable forms and more especially where it is pre-folded or in rolls. The invention includes means for intermittently advancing a series of connected forms smoothly and accurately to a predetermined position with relation to printing line or other operating point of the machine.

The invention has for one of its objects the provision of an improved mechanism of a simple and practical nature for effecting the feed of a sheet or other operations described herein.

A still further object of the invention is the provision of a sheet feeding mechanism actuated by a crank arm mechanism for intermittently advancing a sheet a predetermined distance, the crank arm mechanism being designed to vary the operative movement of the sheet feeding mechanism so as to feed the sheet different distances.

A further object of the invention is the provision of an intermittent feeding mechanism for normally advancing a sheet a predetermined distance and means for adjusting the feeding mechanism to increase or decrease the movement of the sheet. The arrangement being of such a nature that adjustment may be made while the mechanism is in operation.

Another object of the invention is the provision of an intermittent sheet advancing means, comprising a driven member having a normally fixed movement, a motion transfer member operatively connected with the driven member, an operating connection between the motion transfer member and the sheet advancing means, operating means for the driven member, and an adjustable means cooperating with motion transfer member when the driven member is moved by the operating means, whereby the sheet advancing means will be moved according to the resultant movement of the motion transfer member.

A still further object of the invention is the provision of a sheet feeding device having in combination, mechanism for intermittently advancing a sheet and mechanism for continuously advancing the sheet. The arrangement being of such a nature that the continuous advancing mechanism is disabled when the intermittent feed mechanism is operative and vice versa.

To these and other ends the invention resides in certain improvements and combination of parts, all as will be hereinafter more fully described, the novel features being pointed out in the claims at the end of the specification.

In the drawings:

Fig. 5 is a fragmentary vertical section similar to Fig. 3, showing some of the operating parts moved to an intermediate position;

Fig. 6 is a fragmentary vertical section similar to Fig. 3, showing some of the parts adjusted to a different position;

Fig. 7 is a fragmentary side elevation of the right side of casing showing the upper feed roll control lever in normal position to permit insertion of a sheet in the machine;

Fig. 8 is a fragmentary vertical section of the left side of the machine taken substantially on the lines 8—8 of Fig. 2, showing some of the parts in an off-normal position and the sheet held by the gripper pawls;

Fig. 9 is a view similar to Fig. 8, showing the parts in normal position;

Figure 3:
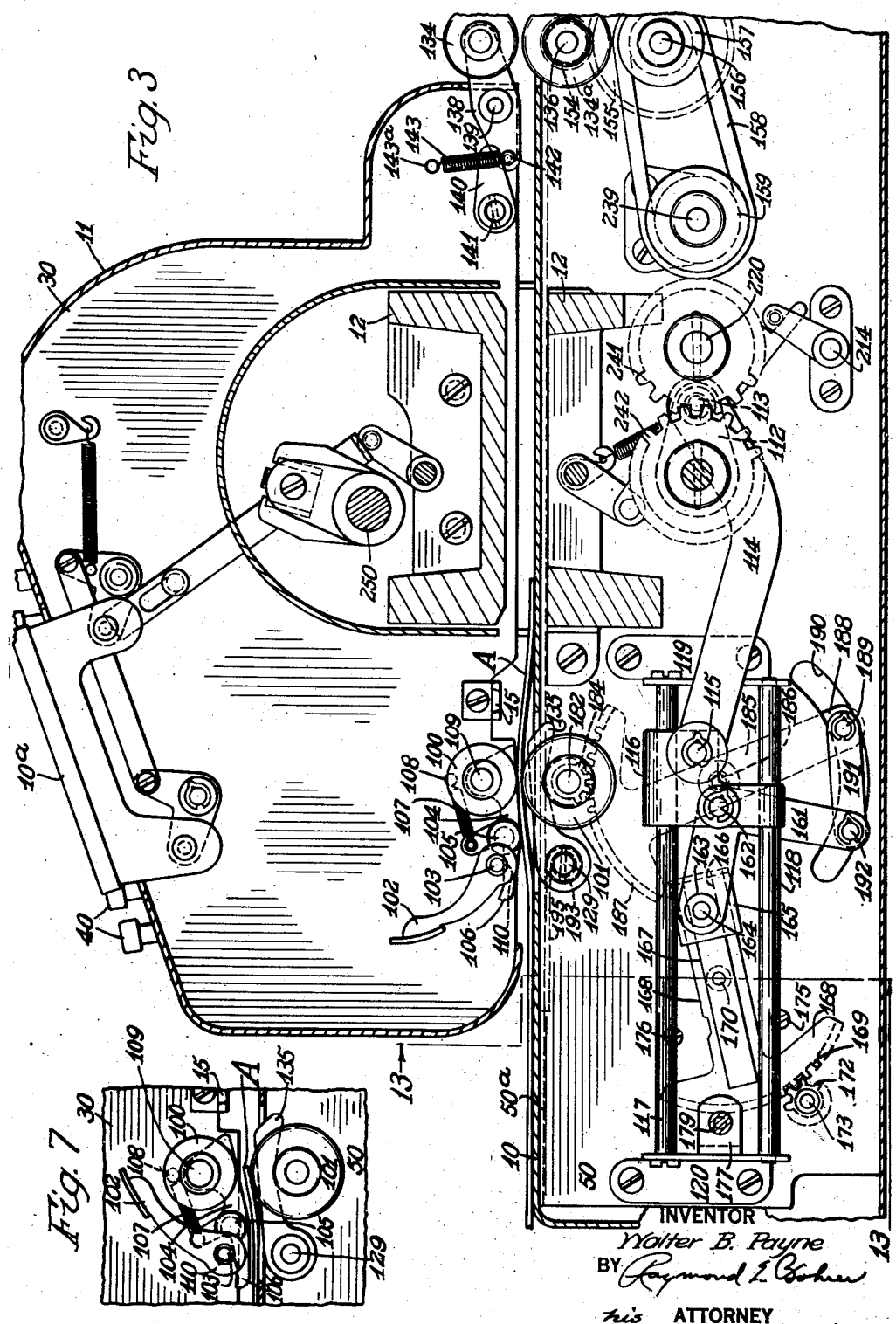
Fig. 3 is a vertical section substantially on the line 3—3 of Fig. 2, with the upper casing broken away and generally illustrating various parts of the operating mechanism.
Figure 10:
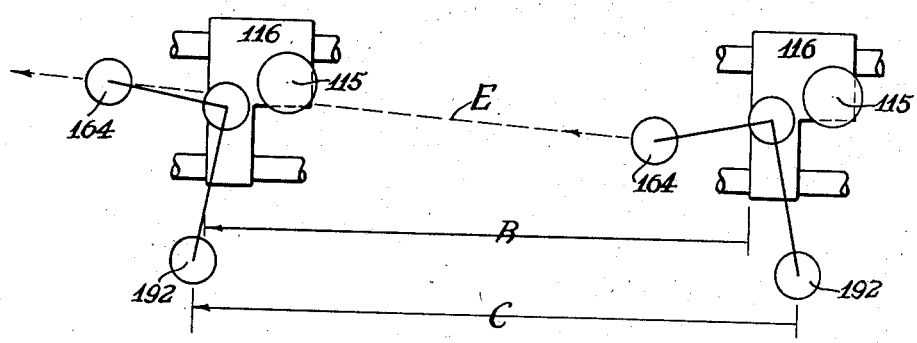
Figure 11:
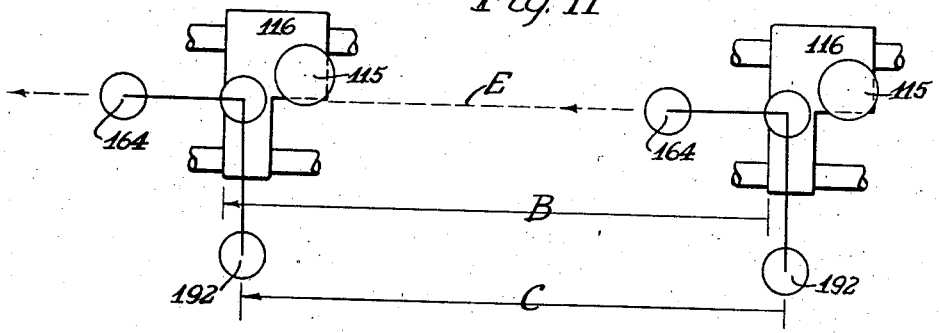
Figure 12:
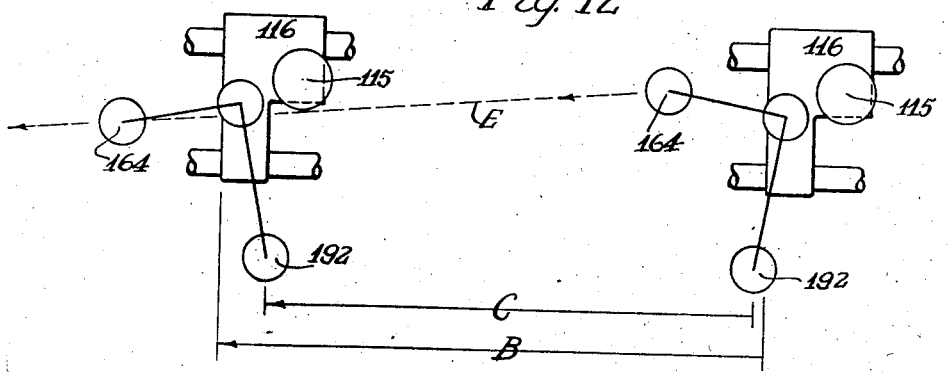

Figs. 10, 11, and 12 are diagrammatic views showing the resultant movement of some of the parts, when the adjustments of the machine are varied;

Fig. 13 is a fragmentary vertical section taken substantially on the lines 13—13 of Fig. 3, and showing part of the casing broken away;

Fig. 14 is a plan view of a modified form of adjusting mechanism for varying the fulcrum point of the crank arm mechanism;

Fig. 15 is a vertical section taken on the line 15—15 of Fig. 14;

Fig. 16 is a plan view partly in section of the adjusting mechanism for varying the fulcrum point of the crank arm mechanism The same reference numerals refer to the same parts throughout the several views.

The present invention may be embodied in machines of various types and is not limited to any particular form of machine, it is equally adapted for printing machines, cutting devices or any other type of apparatus wherein it may be desired to successively advance a sheet or web of paper. As the simplest way to make the invention understood, one specific embodiment and application of it will be described in detail, it being understood that in other instances these details would be varied to suit the different requirements.

The present invention is shown applied to a printing apparatus such as shown and described in my applications Serial No. 704,328, filed December 28, 1933, now issued as Patent No. 2,092,852, granted September 14, 1937, and Serial No. 121,848, filed January 22, 1937, to which reference may be made for information regarding details not herein fully disclosed. Printing machines of the character set forth in the above patent and application are designed primarily for printing characters upon the amount line of checks, drafts and similar instruments although they may be employed also for printing various other articles such, for example, as tickets, statements or other commercial forms.

Figure 1:
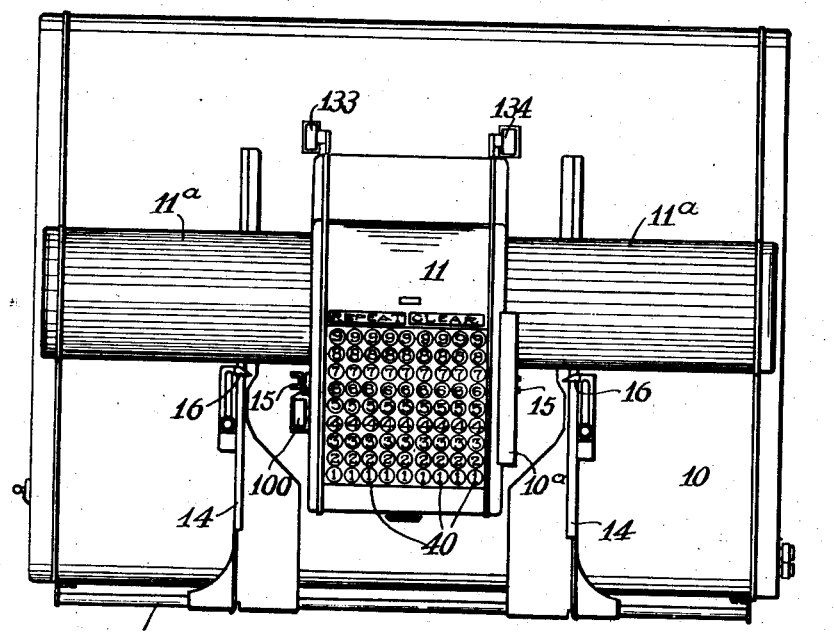
Fig. 1 is a plan view of apparatus constructed in accordance with the preferred embodiment of the invention.
Figure 2:
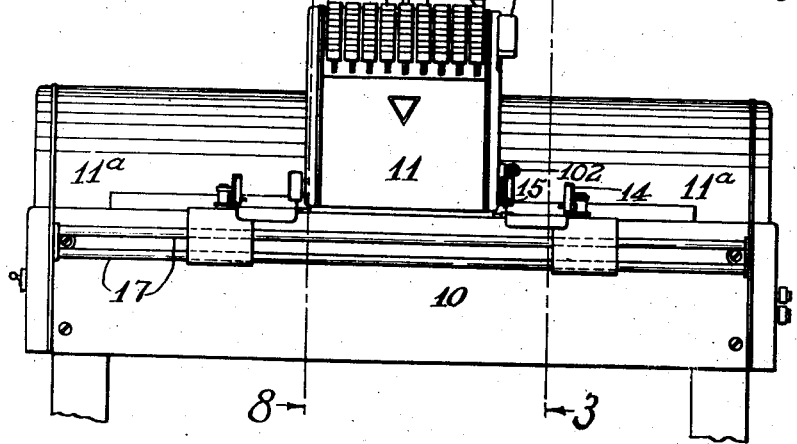
Fig. 2 is a front elevation of the same.

In operating a machine of the kind illustrated, a sheet or the end of a web of continuous check forms A, is placed on the top shelf portion of the base 10 of the machine between the adjustable side guides 14, Figs. 1, 2 and 3. The amount line of the first check is manually adjusted to the printing line of the machine, aided by the sight gauges 15 carried on each side of the casing of the machine. Adjustable sight gauges 16 are carried by the side guides 14 and are adapted to be set with relation to some line or indicia on the checks. The gauges 16 serve as an additional means to readily indicate to an operator that the sheet or web is being fed correctly or incorrectly during rapid operation of the machine.

In order to accommodate checks of various dimensions, the side guides 14 are adjustably mounted on the rods 17 carried by the base, one or both of the guides 14 may be adjusted according to requirements.

As will be clear upon viewing Figs. 1 and 2 and particularly Fig. 7 of the drawings, when the sheet A is being inserted into the machine as above described, the upper feed rollers 100 on each side of the casing 11, are in the "up" position, that is, out of cooperative engagement with the lower driving feed rollers 101. Therefore, the sheet may be readily positioned in the machine with the amount line thereof in proper relation to the sight gauges 15, at the printing line of the machine.

The upper feed rollers 100 located on each side of the casing 11 are controlled by the manually operated lever 102 located on the right side of the casing of the machine, and the rollers are normally in the "up" position as shown in Fig. 7. The lever 102 is rigid with the cross rod 103 loosely carried by the lower part of the side plates 30 of the casing 11. A rocker arm 104 supported on the side plate 30, by the stud 105, has a projecting portion 106 held in cooperative engagement with the cross rod 103, by the spring 107, having one end attached to the rocker arm 104 and the other end to the stud 108 on the side plate 30. The feed roller 100 on the right side of the machine, is rotatably mounted on the stud 109 carried by another projecting portion of the rocker arm 104.

The supporting means for the upper feed roller 100 on the left side of the casing 11, is substantially similar to that just described for the feed roller on the right side. As seen in Fig. 9, the roller 100 on the left side is supported on the stud 109a, carried by the rocker arm 104a, pivotally mounted on the stud 107a, on the side plate 30.

The cross rod 103 carried by the side plates 30, also extends through and beyond the side plate 30 on the left side of the machine. The cross rod 103 is provided with flat spots 110 in planes with the portions 106 and 106a of the rocker arms 104 and 104a. However, when the lever 102 and the rod 103 are in the normal position shown in Figs. 7 and 9, the concentric portion of the rod 103 is engaged by the portions 106 and 106a of the arms 104 and 104a against the tension of the springs 107. The arrangement is such that the upper feed rollers 100 are retained in the "up" position when the lever 102 is in the position shown in Fig. 7.

After the check "A" is positioned with relation to printing line of the machine, such as shown in Fig. 3, the lever 102 is manually moved in a counter-clockwise direction to the position also shown by Fig. 3. The counter-clockwise movement of the lever 102, rigid with the cross rod 103, from the position shown in Figs. 7 and 9 to the position shown in Fig. 3, imparts a counter-clockwise rotation to the rod 103. The rotation of the rod 103 is sufficient to bring the flat spots 110 in position to be engaged by the portions 106 and 106a of the rocker arm 104 and 104a, whereupon, the springs 107 are permitted to rock the arms 104 and 104a so that the rollers 100 will resiliently engage the sheet A and be in cooperative engagement with the lower driving feed rollers 101.

It will be seen that the arrangement just described, provides for synchronized movement of the feed rollers 100. Another pair of upper feed rollers 133 and 134 are arranged at the rear of the casing 11, Figs. 1, 3 and 9. These rollers are adapted to be actuated into and out of cooperative engagement with the constantly rotating lower feed rollers 133a and 134a fixed to the shaft 136, by the set screws 137. The roller 134 is rotatably mounted on the arm 138, carried loose on the cross rod 139, adjacent the side plates 30 of the casing 11, Fig. 3. A member 140 pinned to the rod 141, engages a stud 142 carried by the arm 138, and normally holds the roller 134 out of cooperative engagement with the rotating roller 134a. A spring 143 is connected to the stud 142 on the arm 138, and to a stud 143a carried by the side plates 30. The spring 143 rocks the arm 138, when the member 140 moves away from the stud 142 and the upper roller 134 moves into cooperative engagement with the roller 134a. The rod 141 is supported at its ends by the side plates 30, and as seen in Fig. 8, extends through the side plate on the left side of the machine. A two armed lever 144 is pinned to the extending part of the rod 141. One arm 145 of the lever 144, extends into the path of a stud 146 carried by the roller arm 147, loose on the cross rod 139. The roller arm 147 carries the upper rear feed roller 133 adapted to be moved into and out of cooperative engagement with the lower roller 133a. The other arm of the lever 144 has a laterally formed end 148, in the path of the one end of a push rod 149. The push rod 149 has a reduced portion forming a shoulder 150 in the other end which is engaged by the member 151 supported on the side plate 30 by the stud 152. The member 151 has a projecting portion 153 in engagement with the rod 103, having the flattened portions 110. The member 151 is in a plane with the flattened portion 110 of the rod 103 on the left side of the machine, Figs. 8 and 9.

It will now be seen from Fig. 9 that when the lever 102 on the rod 103 is in normal position, that is, with the concentric part of rod holding the rollers 100 out of engagement with the rollers 101, the flattened portion 110 of the rod 103 is engaged by the portion 153 of the member 151. The tension of spring 152 connected to the roller arm 147, and the spring 143 connected with the roller arm 138, tends to rock the roller arm and to move the upper rollers 133 and 134 into cooperative engagement with the driven lower feed rollers 133a and 134a. When the portion 153 of the member 151 enters the flattened part of the rod 103, the upper end of the member 151 moves clockwise and permits the rod 149 to shift and the two arm lever 144 to rotate on its pivot. The latter movement of the parts is caused by the tension of the springs 152 and 143. However, when the lever 102 is shifted from the position shown in Fig. 7 to the position shown in Fig. 3, the concentric portion of the rod moves the member 151 to the position shown in Fig. 8, whereupon, the upper feed rollers 133 and 134 are moved out of cooperative engagement with the lower driven feed rollers 133a and 134a.

The lower feed rollers 133a and 134a are fixed on the roller shafts 136 mounted in the base plates 50. A pinion 154, pinned to the shaft 136, meshes with a gear 155 fixed on the shaft 156, carrying a pulley 157, Figs. 3, 4 and 8. A belt 158 connecting the pulley 157 to the pulley 159 which is pinned to the drive shaft 239, transmits the continuous rotation of the drive shaft 239 to the shaft 156. The gear 155 meshes with the pinion 154 on the feed roll shaft 136 and continuously drives the feed rollers 133a and 134a.

With the check positioned with respect to the printing line of the machine and the lever 102 moved to allow the upper feed rollers 100 to engage the sheet, the operator is then ready to operate the printing device. Having depressed the keys 40 of the keyboard according to the desired characters to be printed, the operator then depresses the trip bar 10a to start a complete cycle of operation of the machine.

The type unit and other mechanism for positioning the characters at the printing line of the machine according to the keys depressed is set forth in my previously mentioned application No. 704,328, filed December 28, 1933, resulting in Patent No. 2,092,852, dated September 14, 1937. My other application No. 121,848, filed January 22, 1937, sets forth the details relating more particularly to operating mechanisms for actuating a machine of this character by an interacting clutch mechanism operable to render the type moving and positioning means, and the impression means effective during different parts of the cycle of operation of the machine.

Figure 4:
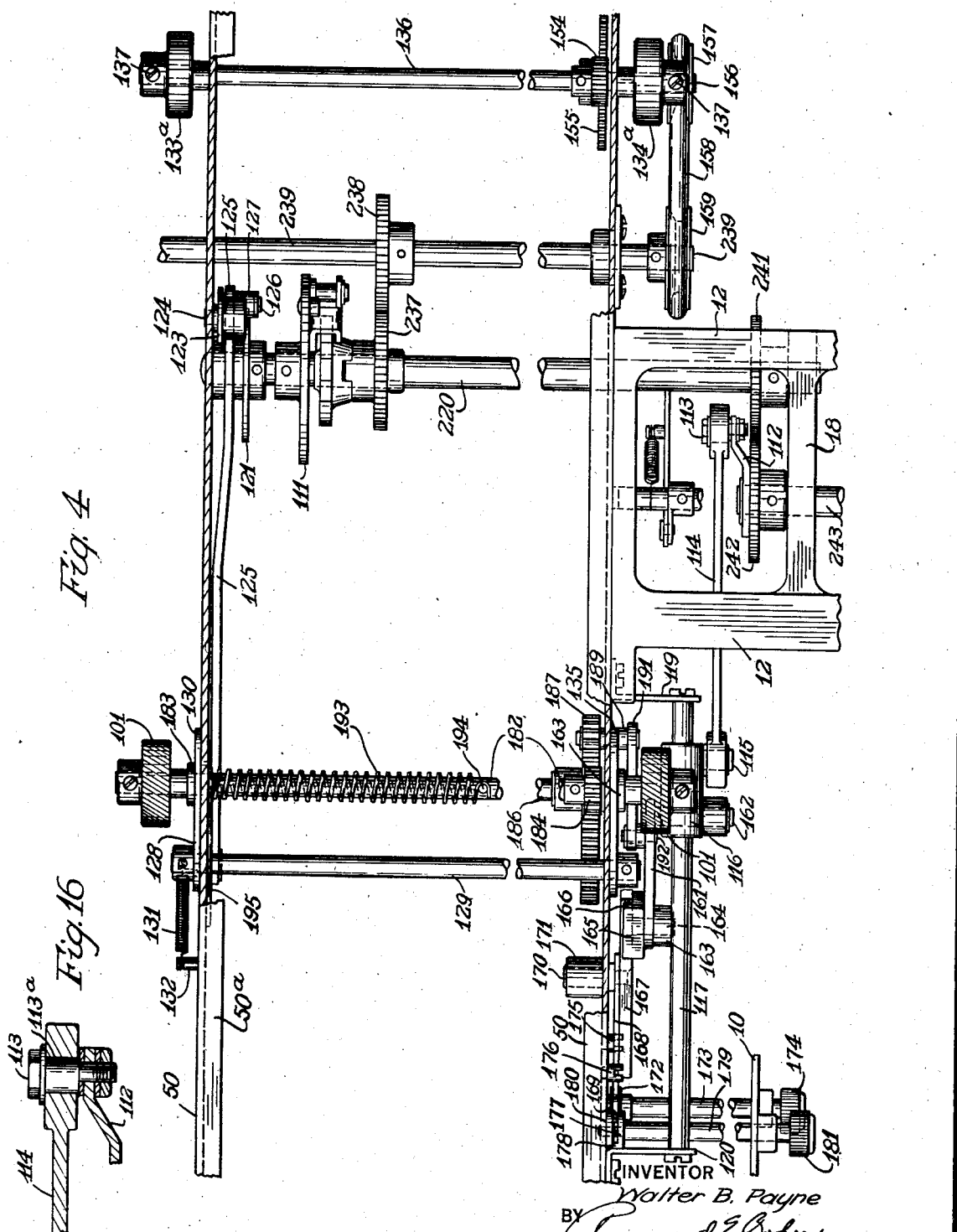
Fig. 4 is a fragmentary plan view of the base of the apparatus with the cover removed and the parts broken away to generally disclose various parts of the operating mechanism.

As described in detail, in the latter mentioned application, the clutch shaft 220, Figs. 3 and 4, is given a partial rotation at one part of the cycle of operation of the machine and the rotation completed at a different part of the cycle, that is, the shaft 220 is connected to a driving means and rotated approximately 180 degrees for actuating the type moving and positioning means to position the desired type at the printing line of the machine. The rotation of the shaft 220 is then temporarily halted during the operation of an impression means adapted to produce an imprint of the characters positioned at the printing line of the machine. After the imprint has been produced by the impression means, the shaft 220 is then again connected with the driving means and its cycle of rotation completed, to actuate the type moving and positioning means, and return the type positioned at the printing line back to normal position. The variable rotary movement of the clutch shaft 220 is accomplished by the clutch mechanism generally indicated by numeral 111 in Fig. 4. The drive shaft 239 driven continuously by a source of power, such as a motor, has a gear 238 pinned thereon meshing with a gear 237 loose on the clutch 220. The gear 237 is operatively connected with the clutch mechanism 111 so that when the clutch is actuated, a driving connection is made between the clutch shaft 220 and the driven shaft 239.

As shown in Fig. 4, the cam 121 is pinned to the shaft 220 and normally in the position shown in Fig. 9. An arm 123 mounted on a stud 124 carried by the base plate 50, has a link 125 pivoted thereto by the stud 126. The stud 126 also carries a cam roller 127 engaging the periphery of the cam 121. As seen in Fig. 9, when the parts just described are in normal position, the roller 127 is partially up the rise 122 of the cam 121. Therefore, the initial counterclockwise movement of the shaft 220 from the normal position shown in Fig. 9, to the position shown in Fig. 8, will cause the rise 122 of the cam 121 to move the arm 123 and the link 125 laterally to the left.

A gripper pawl 128 is pinned to the cross rod 129 carried by the base plates 50, Figs. 8 and 9. The link 125 is operatively connected to the pawl 128 by the stud 128a. The pawl 128 is arranged in a plane with the rocker arm 104a supported by the side plate 30 and has an extending portion 130 adapted to serve as a gripper for the sheet when said pawl 128 is actuated. A tension spring 131 is connected at one end to the pawl 128 and at the other end to a stud 132 carried by the base plate 50. The spring 131 tends to rock the gripper pawl 128 counterclockwise and through the link 125, retains the roller 126, in cooperative engagement with the surface of the cam 121.

The rod 129 having the gripper pawl 128 pinned at one end thereof and supported by the base plates 50, also has a second gripper pawl 135 pinned at the opposite end thereof, Figs. 3 and 4. The pawl 135 is in a plane with the rocker arm 104 and being pinned to the rod 129 is operative with the gripper pawl 128. The gripper pawl 135 moves with rod 129 into cooperative engagement with the sheet A and rocker arm 104 to hold the sheet and move the other upper feed roller 100 out of contact with sheet.

It will be recalled, that after the operator has positioned the sheet A in the machine, the lever 102 is moved from the position shown in Fig. 7 to the position shown in Fig. 3. The movement of the lever 102 rocks the rod 103 so that the flat spots 110 move in a position to permit the springs 107 to rock the arm 104 and 104a and thereby moves the upper rollers 100 into engagement with the sheet A. The operator then having set the keys 40, trips the trip bar 10a and starts the cycle of operation of the machine. As will be seen from Figs. 8 and 9, the initial movement of the clutch shaft 220 in a clockwise direction, will cause the rise 122 of the cam 121 to rock the arm 123 and move the link 125 connected with the gripper pawl 128 pinned on the cross rod 129, to move the portion 130 of the pawl 128 clockwise in a plane with the rocker arm 104a. The portion 130 engages the sheet A, and moves the sheet upwards slightly into engagement with the lower edge of the rocker arm 104a. The sheet is then held from movement by the cooperative engagement of the gripper pawl 128 and the rocker arm 104a. As seen in Fig. 8, showing the pawl 128 after being actuated by the cam 121, the portion 130 is moved into cooperative engagement with the sheet and rocker arm 104a, the arm 104a is rocked slightly in a clockwise direction and moves the upper feed roller 100 out of engagement with the sheet. Therefore, it will be clear that during the initial rotation of the clutch shaft 220, the rise 122 of the cam 121 will cause the gripper pawl 128 to engage and hold the sheet, and also retain the upper feed rollers 100 out of engagement with the sheet.

It will now be seen that the lever 102 is operative to control the front upper feed rollers 100 and the rear upper feed rollers 133 and 134, that is, when the operator desires to insert the end of a new sheet or web of checks, the lever 102 is operative to separate the front upper feed rollers 100. However, it may happen that the previous sheet or web of checks was not fed or taken from the machine. Therefore, when the lever is moved to raise the feed roller 100, it also lowers the rear upper feed rollers 133 and 134 into cooperative engagement with the constantly driven rollers 133a and 134a, to feed the end of the printed sheet from the machine. Fig. 9 shows the lever 102 having raised the feed rollers 100, and the rollers 133 and 134 feeding the printed sheet A from the machine.

Having described the various means for controlling the upper feed rollers, I will now set forth the structure of my preferred embodiment of the mechanism for variably rotating the lower feed rollers 101 to feed a sheet different distances.

The right hand end of the clutch shaft 220 is supported by a bearing carried by one of the base plates 50, Fig. 4. The shaft 220 extends through the base plate 50 on the right side of the machine and is supported by one of the U-shaped members 12 which connect the base 10 and case 11 of the machine. A gear 241 pinned on the shaft 220, meshes with gear 242, fixed on the stub shaft 243, supported by the web 18 and the end wall 37 of the U-shaped member 12.

A crank arm 112 fast on the stub shaft 243, adjacent the gear 242, carries an adjustable eccentric crank pin 113 upon which is mounted the crank link 114, Figs. 3, 4 and 16.

The adjustable crank pin 113 carried by the crank arm 112 has an eccentric portion 113a upon which the crank link 114 is mounted. Adjustment of the eccentric crank pin 113 makes it possible to alter or vary the fulcrum point of the crank link 114, so that the movement conveyed to the link 114 and its associated mechanism by the crank arm 112 may be increased or decreased as desired.

A modified form of adjusting means for altering or varying the fulcrum point of the crank link 114 is best shown in Figs. 14 and 15. The modified structure provides for increasing or decreasing the movement conveyed to the link 114 by the crank arm 112, and may be adjusted even while the machine is in motion without fear of damaging the mechanism. This modified form of adjustment provides for readily and accurately altering the stroke of the crank link 114.

In the modification shown in Figs. 14 and 15, a member 201 is fixed to the stub shaft 243 in place of the crank arm 112. The member 201 is provided with a T-shaped slot 202, in which is slidably supported the adjustable block 203. An adjusting screw 204 is carried by the plate 201a fast to the member 201 and provides for adjustment of the block 203 in the slot 202 of member 201. The crank link 114 is mounted on the stud 205 carried by the block 203. It will be seen that the adjustment of the block 203 on the member 201 will alter or vary the fulcrum point of the crank link 114, so that the movement conveyed to the link by the member 201 may be increased or decreased as described.

The normal position of the crank arm mechanism is shown best in Figs. 3 and 4. However, it will now be clear, that when the clutch shaft 220 rotates through its initial movement of approximately 180 degrees, by the gears 241 and 242, the stub shaft 243, will also be rotated approximately 180 degrees, moving the crank arm 112, from the normal position shown in Fig. 3, to the intermediate position shown best in Fig. 5. In the embodiment of the present machine, the clutch shaft 220 is temporarily at rest in its intermediate position, that is, while the impression mechanism is actuated to produce an imprint of the type positioned at the printing line. After the impression has been made the clutch shaft 220 is rotated to complete its cycle. Therefore, the crank arm 112 will be moved to its intermediate position and remain temporarily in that position, and then subsequently completing its rotation back to its normal position.

The crank link 114, is supported at its other end on the stud 115, carried by a reciprocating member 116, mounted for movement on the rod 117, Figs. 3, 4 and 13. The reciprocating member 116, as shown in Figs. 3 and 13, has a downwardly extending bifurcated end guided by a rod 118. The rods 117 and 118 supporting and guiding the reciprocating member 116, are arranged parallel to one another and have their ends supported by the brackets 119 and 120 secured to the base plate 50.

A motion transfer member 161 is pivoted on a stud 162, carried by the reciprocating member 116. One arm of the member 161, has a bushing 163 fixed thereon. This arm of the lever is pivoted to a laterally extending stud-like portion 164 of the sliding block 165. The block 165 is provided with groove 166, engaging a guide bar 167 carried on an adjustable segmental member 168. The segmental member 168 is provided with a toothed portion 169 and supported intermediate its ends on a stud 170, mounted in a bearing 171, carried by the base plate 50, Figs. 3 and 4.

A pinion 172 pinned to an adjusting rod 173 meshes with the teeth of the portion 169 of the segmental member 168. The adjusting rod 173 extends through the right side of the base 10 and has a knob 174 fixed thereto. In adjusting the segmental member 168, the operator turns the knob 174 in either direction according to requirements as will be set forth below. Stops 175 and 176 carried by the base plate 50, limit the movement of the segmental member 168 so that the teeth of the portion 169 cannot be moved out of engagement with the pinion fixed on the rod 173.

A clamping means is provided to lock the segmental member 168 in any predetermined adjusted position. This means comprises clamping plate 177, having a laterally extending lug 178, of a length slightly less than the thickness of the segmental member 168, Figs. 3 and 4. The plate 177 is also provided with a straight side which normally engages the side bracket 120, Figs. 3 and 4. The clamping rod 179 has a threaded reduced end which passes through an opening in the plate 177. A spacing washer 180 is carried by the reduced end of the rod 179, between the segmental member 168 and the base plate 50. The reduced threaded end of the clamping rod 179 is screwed into a threaded opening of the base plate 50. The other end of the rod 179 extends through the base 10 and has a knob 181 fixed thereto.

It will now be seen that after the segmental member is adjusted by the knob 174 to the desired position it may be locked in position by turning the knob 181 fixed on the clamping rod 179. Turning the rod 179 in a clockwise direction, screws the rod into the base plate 50 and causes the reduced shoulder of the rod to press the clamping plate 177 against the segmental member 168.

The lower drive feed rollers 101 arranged on each side of the casing 10 in a plane with the upper feed rollers 100, are fixed to the driven roller shaft 182, Figs. 3 and 4. The shaft 182 is mounted in bearings 183 carried by each of the base plates 50. The peripheral surface of the feed rollers 101 is preferably knurled or grooved as shown in Figs. 4 and 13.

The driven roller shaft 182 has the pinion 184 pinned thereto adjacent the inside wall of the base plate 50 on the right side of the machine. A roller shaft actuating member 185 is mounted intermediate its ends on the rod 186 carried by the above mentioned base plate 50. An extending toothed portion 187 of the actuating member 185 is in a plane with the pinion 184 pinned to the shaft 182. Another extending portion 188 of the actuating member 185 carries a stud 189 which extends through an elongated opening 190 formed in the base plate 50, Figs. 3 and 13. A link 191 is carried at one end by the stud 189 on the actuating member 185, and at the other end by a stud 192 on the motion transfer member 161 pivoted to the reciprocating member 116.

A torsional spring 193 provided around the driven roller shaft 182, has one end fastened to a stud 194 carried by the shaft 182, and the other end 195 held under the flange 50a of the base plate 50. The spring 193 serves to take the backlash out of the gear train comprising the gear 184, and portions 187 of the segmental member 185 so that the feed rollers 160 will rotate the proper distance from the same starting point.

It will be recalled that crank arm 112, is rotated through approximately 180 degrees, during the operation of the clutch shaft 220 in positioning the desired type at the printing line of the machine, the crank arm is then temporarily held at rest in its intermediate position, while the impression mechanism is actuated to produce an impression from the type positioned at the printing line. After the impression mechanism has completed its cycle of operation, the clutch shaft 220 is again actuated to effect the operation of the type positioning means to return the type to normal position. During the latter operation the crank arm 112 will be actuated by the clutch shaft 220 to complete its cycle of operation.

The driving feed rollers 101 of present embodiment are arranged to be moved in one direction by the initial movement of the clutch shaft 220 and the crank arm 112, and in the other direction on the second part of the cycle of operation of the clutch shaft 220 and the crank arm 112. While the movement given the reciprocating member 116 by the crank arm 112 through the connecting link 114, is normally constant, the eccentric stud 113 and adjustable segmental member 168 provides for variable rotation of the feed roller 101 in the manner to be presently described.

It is desirable to advance the sheet or web of checks A so as to present successive forms to the printing line of the machine. The sheet may be either before or after the impression has been made by the machine. However, in the present instance, I have arranged for advancing the sheet after the impression has been made on the check. That is, after an impression has been made on a form, the next form is automatically positioned at the printing line of the machine.

It is common in commercial use of a printing apparatus of the character described, to use lots of sheets or webs of forms of different widths. Furthermore, even with the same lot of sheets or in one web of forms slight variations are present, due sometimes to inaccuracy in printing or to the expansion or contraction of the paper caused by climatic conditions. Therefore, the feeding mechanism must be readily adjusted, not only to accommodate different sets of connected forms of varying widths, but also to correct minor differences between one form and another.

In the normal operation of the machine, the clamping member 177 is released and the knob 174 is manually rotated in the proper direction to effect adjustment of the feed mechanism so that the feed rollers 101 in their intermittent clockwise movement will feed the sheet sufficiently to accurately position a given point of each successive form at the printing line of the machine. In the event the range of adjustment of the knob 174 is not sufficient, the eccentric stud 113 will provide a major adjustment of the fulcrum of the crank link 114 to alter the stroke of the reciprocating member 116 and movement of the actuating member 185.

With a sheet positioned in the machine and the lever 102 tripped so that the feed rollers 100 and 101 are in cooperative engagement, the operator depresses the trip bar 10a to effect the printing and feeding operation of the machine. As previously described in detail, the cam 121 on the clutch shaft 220 rocks the arm 128 so as to clamp the sheet by the clamping member 135 and portion 138 of the arm 128 moving into cooperative engagement with the rocker arms 104 and 104a. At the same time the upper feed rollers 100 are temporarily moved out of engagement with the sheet.

The movement of clutch shaft 220 causes the crank arm 112, through the link 114 to move the reciprocating member from the normal position shown in Fig. 3 to the advanced position shown in Fig. 5. The clutch shaft being arranged to remain at rest after rotating 180 degrees and until the impression means has been actuated, therefore, retains the feed mechanism during the impression part of the cycle of the machine at rest.

When the reciprocating member is advanced as just described, the motion transfer member 161 pivoted thereon is moved through a corresponding path of movement. However, in view of the operating connection of the transfer member with the slide block 165, the transfer member is rocked according to the angular relation of the guide bar 167 with the path of movement of the reciprocating member as will be discussed below.

The resultant movement conveyed to the motion transfer member by the movement of the reciprocating member will be conveyed to the actuating member 185 by the link 191. The actuating member 185 thereupon rotating the feed rollers 101 in a counter-clockwise direction, while the sheet is clamped by the gripping pawls 135 and 130, and the rocker arms 104 and 104a. The angular rotation of the feed rollers 101 depends entirely upon the resultant motion conveyed to the motion transfer member.

As the clutch shaft nears the completion of its initial 180 degree rotation, the periphery of the cam 121 is arranged to rock the gripper pawls 128 and 135. The movement of the gripper pawls 128 and 135 releases the sheet and allows the rocker arms 104 and 104a to move and permit the upper feed rollers 100 to again contact the sheet.

After the impression mechanism has completed its cycle of operation, the clutch shaft is actuated to complete its cycle of operation. Therefore, the return movement of the reciprocating member, through the motion transfer member will cause the actuating member 185 to rotate the feed rollers 101 and advance the sheet a predetermined distance, and vary the speed of rotation according to said adjustment.

If it is desired to reduce the feeding action of the rollers 101, the knob 174 is rotated in a clockwise direction, thereby moving the segmental member 168 counter-clockwise about its pivot 170. With the machine at rest, the counter-clockwise movement of the member 168 moves the pivot point 164 and in turn the motion transfer member 161 about its pivot 162 in a clockwise direction. The clockwise movement of the stud 192 carried by the motion transfer member 161, through the link 191, rotates the feed roller shaft actuating member 185 about its pivot 186 in a clockwise direction.

In the event it is desired to increase the feeding action of the rollers 101, the knob 174 is rotated in a counter-clockwise direction, thereby moving the segmental member 168 about its pivot 170 in a clockwise direction. The latter movement of the member 168 causes the motion transfer member 161 to rotate in a counter-clockwise direction and move the feed roller shaft actuating member 185 in a counter-clockwise direction.

The adjustment of member 168 varies the angular relation of the guide bar 167 to the path of movement of the reciprocating member 116. The motion transfer member operatively connected to the reciprocating member and the guide bar 167 has a compensating movement depending upon the angular relationship of the guide bar to the path of movement of the reciprocating member. In the event the guide bar is adjusted to a plane parallel with the plane of movement of the reciprocating member, the movement of the transfer member will be equal to the movement of the reciprocating member. In view of the connection between the motion transfer member and the feed roller actuating member, the movement of the former member will be conveyed to the latter member and to the feed rollers 101.

The variant movements conveyed to the motion transfer member 161 will be clearly understood by reference to the diagrammatic illustration shown in Figs. 10, 11 and 12. The representation on the right side of Fig. 12 shows the normal position of the reciprocating member 116, as in Fig. 3. The path designated as E shows the path in which the sliding block 165 moves when the guide bar 167 carried by the segmental member 168 is adjusted to the position shown in Fig. 3. The representation on the left side of Fig. 12 shows the reciprocating member having moved through its path of movement marked B and the parts in the position shown in Fig. 5.

In the latter movement of the reciprocating member, the point 164, representing the pivot connection of the motion transfer member 161 with the sliding block 165, has been moved in the path E. As will be seen, the point 192, representing the pivot connection of the motion transfer member with the link 191, has moved through the path C, that is, the resultant movement C conveyed by the motion transfer member has been less than the movement B of the reciprocating member.

In Fig. 11, path E is shown parallel to the path of movement of the reciprocating member, that is, the guide bar 167 carried by the segmental member is adjusted to an intermediate position, parallel to the path of movement of the reciprocating member 116. As will be seen the resultant movement C conveyed by the motion transfer member is equal to the movement B of the reciprocating member.

As will be seen in Fig. 10, path E is arranged in an opposite direction to that shown in Fig. 6. The resultant movement of C conveyed by the motion transfer member is greater than the movement B of the reciprocating member.

The invention is not to be limited to or by details of construction of the particular embodiment thereof illustrated by the drawings, as various other forms of the device will of course be apparent to those skilled in the art without departing from the spirit of the invention or scope of the claims.

I claim as my invention:

1. A sheet feeding mechanism comprising means for advancing a sheet, a driven member having a normally fixed reciprocating movement, a motion transfer member operatively connected to and bodily movable with said driven member, a positive operating connection between said motion transfer member and said sheet advancing means, operating means for moving said driven member through its normally fixed movement, and a normally stationary means cooperating with said motion transfer member throughout the entire movement of said driven member for controlling the degree of movement imparted by said motion transfer member to said sheet advancing means when the driven member is moved by the operating means.

2. A sheet feeding mechanism comprising means for advancing a sheet, a reciprocating member having a normally uniform movement, a motion transfer member operatively connected to and bodily movable with said reciprocating member, a normally stationary adjustable element, and an operating means connected directly with said reciprocating member, said operating means adapted to bodily move said reciprocating member through its normal uniform movement and the motion transfer member connected thereto, whereby the movement of said sheet advancing means is controlled by the extent of movement imparted thereto by the cooperation of said motion transfer member with said adjustable element throughout the entire movement of said reciprocating member so as to advance the sheet a predetermined distance, and means for varying the position of said normally stationary element.

3. A sheet feeding mechanism comprising means for advancing a sheet, a supporting means, a reciprocating member slidably supported on said supporting means and having a normally uniform movement, a motion transfer member carried by and bodily movable with said reciprocating member, a normally stationary adjustable element, and an operating means connected directly with said reciprocating member, said operating means adapted to bodily move said reciprocating member carrying said motion transfer member, whereby the movement of said sheet advancing means is controlled by the degree of movement imparted thereto by the cooperation of said motion transfer member with said adjustable element throughout the entire movement of said reciprocating member so as to advance the sheet a predetermined distance, manual means for varying the position of said adjustable member and means for locking the adjustable member in a predetermined adjusted position.

4. A sheet feeding mechanism comprising means for advancing a sheet, a supporting means, a driven member on said supporting means and having a normally uniform sliding movement thereon, a motion transfer member operatively connected to and bodily movable with said driven member, an operating connection between said motion transfer member and said sheet advancing means, operating means for moving said driven member through its normally uniform movement, and a normally stationary means connected with said motion transfer member for controlling the degree of movement imparted by the motion transfer member to said sheet advancing means when the driven member is moved by the operating means, adjustable eccentric means included in said operating means for varying the movement of said driven member.

5. A sheet feeding mechanism comprising means for advancing a sheet, a supporting means, a reciprocating member mounted for normally uniform sliding movement on said supporting means, a motion transfer member carried by said reciprocating member and operatively connected to the sheet advancing means, a normally stationary adjustable guide block supported intermediate its ends, means connecting said motion transfer member with said guide block, and an operating means, said operating means adapted to bodily move said reciprocating member carrying said motion transfer member, whereby the movement of said sheet advancing means is controlled by the resultant movement imparted to said motion transfer member through its connection with said normally stationary guide block and its movement with said reciprocating member to advance the sheet a predetermined distance, means for varying the position of said adjustable guide block.

6. In a sheet feeding mechanism the combination of means for advancing sheet, said sheet advancing means including a plurality of feed rollers operative to engage and feed a sheet predetermined distances, a supporting means, a driven member mounted on said supporting means and having a normally fixed sliding movement thereon, a motion transfer member pivotally mounted on said driven member and operatively connected to said sheet advancing means, operating means for bodily moving said driven member which carries said motion transfer member, and a normally stationary means operatively connected at all times with said motion transfer member for controlling the movement of same, whereby the feed rollers of said sheet advancing means will be rotated according to the resultant movement imparted to said motion transfer member through its connection with said normally stationary means and its movement with said driven member when the driven member is actuated by the operating means.

7. A sheet feeding mechanism comprising means for advancing a sheet, a support, a reciprocating member mounted for sliding movement on said support, a motion transfer member pivoted on said reciprocating member and positively connected to the sheet advancing means, operating means for moving said reciprocating member on said support and moving the pivot point of the motion transfer member through a path of movement, and a normally stationary adjustable means connected with another portion of said motion transfer member for controlling the movement conveyed to the sheet advancing means by said motion transfer member when it is moved with the reciprocating member, means for varying the position of said adjustable member, and adjustable means for varying the movement of said reciprocating member.

8. A sheet feeding mechanism comprising means for advancing a sheet, a supporting rod, a reciprocating member mounted for a normally uniform sliding movement on said rod, a motion transfer member pivoted on said reciprocating member and operatively connected to the sheet advancing means, operating means for said reciprocating member, a normally stationary member, means connecting said motion transfer member with said normally stationary means, said stationary means adapted to control the extent of movement imparted by said motion transfer member to said sheet advancing means when the reciprocating member is actuated by said operating means, said operating means including a crank arm, a link connecting the crank arm with the said reciprocating member, and an eccentric means forming a fulcrum for said link and adjustable to different positions to vary the stroke conveyed to the reciprocating member by said crank arm.

9. A sheet feeding mechanism comprising means for advancing a sheet, a support, a reciprocating member slidably mounted on said support, a motion transfer member pivotally carried by said reciprocating member and operatively connected to the sheet advancing means, operating means for said reciprocating member, a normally stationary adjustable means, means connecting said motion transfer member with said stationary means, said stationary means controlling the movement of said transfer member when it is moved with said reciprocating member and effecting a resultant movement to the sheet advancing means, said operating means including an adjustable means for varying the movement of said reciprocating member, said adjustable means comprising a rotatable element, and adjustable member and a link operatively connected with said adjustable member and said reciprocating member, said adjustable member mounted on said rotatable element and adapted to move relatively to the axis of the same, whereby the fulcrum for said link may be adjusted with respect to the axis of the rotatable member to vary the movement conveyed to the reciprocating means by the operating means.

10. A sheet feeding mechanism comprising means for advancing a sheet, a supporting means, a reciprocating member mounted for sliding movement on said supporting means, a motion transfer member pivotally carried by said reciprocating member and positively connected to the sheet advancing means, operating means for moving said reciprocating member through a normally fixed movement, and an adjustable means connected to and restricting the movement of said motion transfer member at all times for controlling the movement of the same when it is moved with said reciprocating member, said adjustable means comprising an adjustable member pivoted intermediate its ends, said adjustable member having a control part extending each side of its pivot and adapted for angular adjustment with respect to the movement of said reciprocating member, whereby the resultant movement of said motion transfer member will be dependent upon the angular relation of the control part of said adjustable member to the path of movement of the reciprocating member.

11. A sheet feeding device for a printing machine having a printing point comprising a plurality of cooperating feed elements adapted to engage and successively advance given areas of a sheet to said printing point in one direction, a supporting means, a reciprocating member having a normally fixed sliding movement on said supporting means, a motion transfer member pivotally connected to said reciprocating member, an actuating member adapted to move one member of said feed elements, a positive operating connection between said motion transfer member and said actuating member, operating means for moving said reciprocating member, and an adjustable means connected with said motion transfer member for controlling at all times the movement of one portion thereof, whereby the said actuating member will cause said feeding elements to advance a sheet according to resultant movement imparted to said motion transfer member through its connection with said adjustable means and its movement with said reciprocating member.

12. A sheet feeding device comprising means for engaging and successively advancing a sheet or web of continuous forms, a reciprocating member having a normally fixed movement, a pair of parallel rods for supporting and guiding said reciprocating member, supporting means for said rods, a motion transfer member pivotally carried by said reciprocating member, an operating connection between said motion transfer member and said sheet engaging and advancing means to convey the movement of said motion transfer member to said sheet advancing means, a crank arm mechanism for sliding said reciprocating member on said rods, operating means for said crank arm mechanism, and a manually adjustable member, said motion transfer member connected with said adjustable member, whereby the resultant movement of said motion transfer member through its connections will be conveyed to said sheet engaging and advancing means to cause the sheet or web of continuous forms to move a predetermined distance upon each actuation of said operating means.

13. A sheet feeding mechanism comprising sheet advancing means including a plurality of sets of feed rollers adapted to engage and advance a sheet, each set of feed rollers including a contact roller adapted to be moved to and from the sheet and a driven roller, said driven roller having a rotary non-feed movement in one direction and a rotary feeding movement in the other direction to advance a sheet a predetermined distance, manual means for moving said contact rollers to and from the sheet, means for rotating said driven rollers including a driven member, a motion transfer member carried by said driven member, operating connection between said motion transfer member and said sheet advancing means, to convey the movement of the transfer member to the sheet advancing means, operating means for said driven member, a normally stationary adjustable means connected with said motion transfer member for controlling the movement of same when the reciprocating member is moved by the operating means, and movable gripper means controlled by said operating means for holding the sheet from movement and separating said rollers during the non-feeding movement of said driven rollers.

14. A sheet feeding device having, in combination, mechanism for intermittently advancing a sheet predetermined distances along a path of travel and a second mechanism adapted to continually feeding the sheet arranged at another point along said path of travel, operating means for both of said feeding mechanism, manual means for selectively controlling the feeding mechanisms whereby the second mentioned continuous feed mechanism is disabled when the intermittent feed mechanism is operative and vice versa, and means for adjusting the intermittent feed mechanism to vary the distance a sheet is advanced upon each actuation thereof.

15. In a sheet feeding mechanism, the combination of means for advancing a sheet including a plurality of feed rollers operative to engage and feed a sheet predetermined distances, a supporting means, a reciprocating member having a normally uniform sliding movement on said supporting means, a motion transfer member pivotally mounted on said reciprocating member, said motion transfer member comprising a bell crank lever having one arm thereof operatively connected to said sheet advancing means for moving same, operating means for slidably moving said reciprocating member on said support and moving the pivot point of said bell crank, normally stationary means operatively connected with the other arm of said bell crank lever, whereby the sheet advancing means will be moved according to the resultant movement imparted to said bell crank lever through its connection with said stationary means and its movement with said reciprocating member.

16. In a feeding mechanism comprising means for advancing a sheet, a supporting means, a driven member having a normally uniform sliding movement on said support, a motion transfer member pivoted on and movable with said driven member, said motion transfer member connected at all times with the sheet advancing means, a normally stationary adjustable member, means operatively connecting said motion transfer member and said adjustable member, operating means adapted to move said driven member through its normally uniform sliding movement on said support, whereby the sheet advancing means will be moved by said motion transfer member according to the resultant movement imparted to the motion transfer member through its connections with said stationary member and its movement with said reciprocating member, and manual means for shifting said normally stationary member in one direction to increase the resultant movement of said motion transfer member and for shifting said normally stationary member in an opposite direction to decrease the resultant movement of said motion transfer member.

17. A sheet feeding device comprising feed rollers for moving a sheet, a pivoted segmental actuator for moving certain of said rollers, a support, a movable member mounted on said support for reciprocating sliding movement, a bell crank lever pivotally carried by said movable member, a link connecting one arm of said bell crank lever and said segmental actuator, a normally stationary adjustable cam element cooperating with the other arm of said bell crank lever, operating means for said movable member, whereby the segmental actuator for said feed rollers will be moved according to the resultant movement imparted to said bell crank lever through its cooperation with said cam element and its movement with said movable member.

18. In a sheet feeding device as set forth in claim 17 in which said cam element is carried by a pivoted segmental member, and manual means for adjusting said segmental member for varying the position of said cam element.

19. In a sheet feeding device as set forth in claim 17 in which said cam element is mounted on a pivoted segmental member, manual means for adjusting said segmental member for varying the position of said cam element, and a clamping means for holding said segmental member in its adjusted position.

WALTER B. PAYNE.